United States Patent
Brooks et al.

(10) Patent No.: US 10,586,302 B1
(45) Date of Patent: Mar. 10, 2020

(54) SYSTEMS AND METHODS TO GENERATE AN ENVIRONMENTAL RECORD FOR AN INTERACTIVE SPACE

(71) Applicant: Meta View, Inc., San Mateo, CA (US)

(72) Inventors: Conner Brooks, San Mateo, CA (US); Joshua Hernandez, Redwood City, CA (US); Moqian Tian, Redwood City, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 15/684,877

(22) Filed: Aug. 23, 2017

(51) Int. Cl.

| | |
|---|---|
| *G06T 1/00* | (2006.01) |
| *G06T 7/73* | (2017.01) |
| *G06K 9/00* | (2006.01) |
| *G06T 19/00* | (2011.01) |
| *G06T 1/20* | (2006.01) |
| *H04L 29/06* | (2006.01) |
| *G06K 9/46* | (2006.01) |
| *G06K 9/62* | (2006.01) |

(52) U.S. Cl.
CPC ........ *G06T 1/0007* (2013.01); *G06K 9/00671* (2013.01); *G06T 1/20* (2013.01); *G06T 7/74* (2017.01); *G06T 19/006* (2013.01); *G06K 9/4671* (2013.01); *G06K 9/6202* (2013.01); *H04L 67/38* (2013.01)

(58) Field of Classification Search
CPC ....... G06T 19/006; G06T 19/00; G06T 19/20; G06T 7/20; G06T 2210/61; A63F 13/65; A63F 13/213; A63F 13/428; G06F 3/04815; G06F 8/658; G06F 11/3476
See application file for complete search history.

(56) References Cited

U.S. PATENT DOCUMENTS

| | | | |
|---|---|---|---|
| 2010/0124274 A1* | 5/2010 | Cheok ................. | H04N 19/176 375/240.03 |
| 2014/0002647 A1* | 1/2014 | Xu ......................... | G11B 27/28 715/713 |
| 2014/0375947 A1* | 12/2014 | Park ....................... | G02C 5/16 351/113 |
| 2015/0002734 A1* | 1/2015 | Lee ..................... | H04N 5/2256 348/367 |
| 2016/0042251 A1* | 2/2016 | Cordova-Diba .......... | G06T 5/00 382/180 |
| 2017/0124713 A1 | 5/2017 | Jurgenson | |
| 2017/0235143 A1 | 8/2017 | Chi | |

* cited by examiner

*Primary Examiner* — Haixia Du

(57) ABSTRACT

Systems and methods to generate an environmental record for an interactive space are presented herein. An environmental record may represent a set of local environments and may define archival location compositions for the local environments. An archival location composition for a local environment may define aspects of the local environment associated with one or more objects and/or surfaces previously determined to be present in the local environment. A headset worn by a user in the local environment may generate a current location composition based on output signals from sensors included in the headset. The archival and current location compositions may be compared to determine updates for the environmental record.

18 Claims, 6 Drawing Sheets

SYSTEMS AND METHODS TO GENERATE AN ENVIRONMENTAL RECORD FOR AN INTERACTIVE SPACE

FIELD OF THE INVENTION

The systems and methods described herein relate to generating an environmental record for an interactive space.

BACKGROUND OF THE INVENTION

There are many types of vision systems that provide virtual and/or augmented reality (AR) displays. In particular, wearable technology such as head mounted displays (HMD) may be used. To effectively use such technology within a virtual and/or augmented reality space, it may be required to construct an understanding of real-world objects and/or surfaces within an environment surrounding a user and/or keep track of the user's location within the environment.

SUMMARY

One or more implementations of the systems and methods described herein generating an environmental record for an interactive space. An interactive space may include one or both of a virtual reality environment and/or an augmented reality environment. An augmented reality environment may include views of images of virtual content superimposed over views of a real-world environment. A virtual reality environment may include views of images of virtual content within a virtual environment.

An environmental record may include information describing aspects of an environment as seen from a client device (e.g., a headset). An environment may include a set of local environments. Individual portions of an environmental record may include information describing aspects of individual local environment as seen from a client device (e.g., a headset). A local environmental record may be used by individual headsets during participation in an interactive space. The local environmental record may include information describing aspects of a local environment as seen from a client device (e.g., a headset) and may include information derived from headsets physically present within the individual local environments and/or information obtained from an environmental record.

In general, information describing aspects of an individual local environment may provide an understanding of a composition of the individual local environment, and may be referred to as a "location composition." The location composition of an individual local environment may describe one or more of physical dimensions of the individual local environment, one or more objects and/or surfaces present in and/or moving through the individual local environment, and/or other information related to the composition of the individual local environment. More specifically, in some implementations, a location composition may be specified by one or more of a set of keypoints, a set of keyframes, a co-visibility graph, and/or other information.

A keypoint may be related to a visually salient 3D feature point in space. A keypoint may be specified by one or more of a 3D position of that point relative to a reference frame, a 2D position of the point as seen in one or more camera images, a descriptor including a uniquely, or nearly-uniquely identifying description of an appearance of the immediate surroundings of that point, a timestamp of when the keypoint was created, a quantifier of an uncertainty regarding the 3D position, and/or other information.

A keyframe may be related to a point of view within an individual local environment defining a field of view within the individual local environment. The point of view may include an orientation and/or position within the location with respect to one or more degrees of freedom. In some implementations, point of view may be defined with respect to 6 degrees of freedom. In some implementations, the point of view in a location may be determined by a pose of a headset in the location. By way of non-limiting illustration, a keyframe may be specified by one or more of a point of view, a quantifier of an uncertainty regarding the point of view, one or more images captured within a field of view at the point of view, a set of keypoints visible within the one or more images, a timestamp associated with the generation of the keyframe, a GPS coordinate associated with the generation of the keyframe (e.g., derived from sensors of a headset), and/or other information. The quantifier of the uncertainty regarding the point of view may include a covariance matrix and/or other quantifier of the uncertainty regarding the point of view. The field of view may be determined based on a field of view of an image sensor.

One or more implementations of the systems and methods presented herein describe techniques where an environmental record may be created, stored, and/or updated. The environmental record may include information defining location compositions of a set of local environments. Information may be obtained from headsets over time such that the environmental record may be continuously updated. The information stored in the environmental record for individual local environments may be referred to as "archival location compositions." The compositions generated by individual headsets may be referred to as "current location compositions."

A system configured to generate an environmental record for an interactive space may include one or more of a headset, an environmental record server, and/or other components. The headset may be configured to be worn by a user. The headset may include one or more of a first sensor, a second sensor, a first set of one or more physical processors, and/or other components. The first sensor coupled to the headset may be configured to generate output signals conveying visual information. The visual information may define images of a first local environment within a real-world environment over time. The real-world environment may include the first local environment and one or more other local environments. The second sensor coupled to the headset may be configured to generate output signals conveying position and/or orientation information. The position and/or orientation information may specify position and/or orientation of the headset over time.

The first set of one or more physical processors coupled to the headset may be configured by machine-readable instructions. The machine-readable instructions may include one or more of an input component, a local environment component, an update component, and/or other components.

The input component may be configured to obtain, from non-transitory electronic storage coupled to the environmental record server, a portion of an environmental record of the real-world environment. The portion of the environmental record may define an archival location composition for the first local environment. The archival location composition may define aspects of the first local environment including a description of a first set of one or more objects and/or surfaces previously determined to be present in the first local environment. The description may be in the form of keypoints and/or keyframes.

The input component may be configured to obtain the output signals from one or more of the first sensor, the second sensor, and/or other sensors.

The local environment component may be configured to generate, based on the output signals from the first sensor, the second sensor, and/or other sensors, a current location composition for the first local environment. The current location composition may define aspects of the first local environment including a description of a second set of one or more objects and/or surfaces currently present in and/or moving through the first local environment.

The update component may be configured to determine differences between the current location composition and the archival location composition, effectuate transmission of information indicating the differences to the environmental record server, and/or other perform other operations.

The environmental record server may include a second set of one or more physical processors configured by machine-readable instructions. The machine-readable instructions may include one or more of an input component, an environmental record component, an update component, and/or other components.

The environmental record component may be configured to effectuate storage of the environmental record.

The input component may be configured to obtain, from the first set of one or more physical processors coupled to the headset, the information indicating the differences between the current location composition and the archival location composition.

The update component may be configured to update the portion of the environmental record based on the information indicating the differences between the current location composition and the archival location composition.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
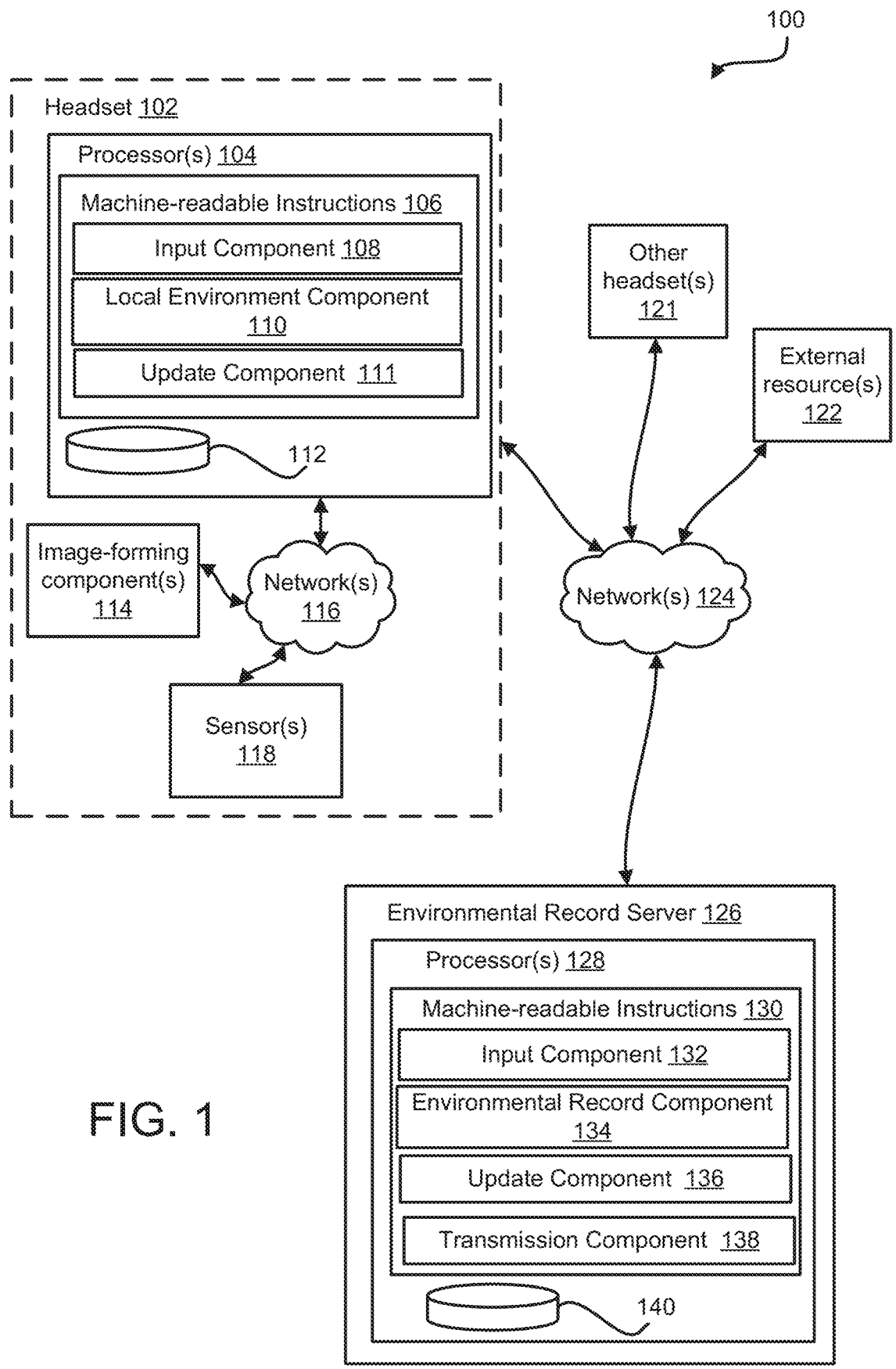
FIG. 1 illustrates a system configured to generate an environmental record within an interactive space, in accordance with one or more implementations.

FIG. 1 shows a system 100 configured to generate an environmental record within an interactive space, in accordance with one or more implementations. An interactive space may include one or both of an augmented reality environment, a virtual reality environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

Users of the interactive space may wear device (e.g., headsets) configured to detect and/or recognize their surroundings when present in local environments. The detection and/or recognition of the surroundings of individual local environments may facilitate generation of individual local environmental records for individual local environments. A local environmental record may include a current location composition defining aspects of a local environment as seen from an individual headset. As used herein, the term "local environment" may refer to a portion of a real-world environment immediately surrounding a headset and/or user. The portion of the real-world environment immediately surrounding the headset and/or user may be determined by range(s) of sensor(s) included in the headset. The term "environment" may refer to a set, or collection, of local environments. By way of non-limiting illustration, an environment may include a building, while an individual local environment may include an individual room in the building. A local environmental record may be associated with the individual room in the building, while an environmental record may be associated with a set of rooms in the building.

A local environmental record may include information describing aspects of a particular local environment within a set of local environments. In general, information describing aspects of an individual local environment may provide an understanding of a composition of the individual local environment, referred to as a "location composition." The location composition of an individual local environment may define one or more of physical dimensions of the individual local environment, objects and/or surfaces present in and/or moving through the individual local environment, and/or other information related to the composition of the individual local environment. More specifically, in some implementations, a location composition may be specified by one or more of a set of keypoints, a set of keyframes, a co-visibility graph, and/or other information.

A keypoint may be related to a visually salient 3D feature point in space. A keypoint may be specified by one or more of a 3D position of that point relative to a reference frame, a 2D position of the point as seen in one or more camera images, a descriptor including a uniquely, or nearly-uniquely identifying description of an appearance of the immediate surroundings of that point, a timestamp of when the keypoint was created, a quantifier of an uncertainty regarding the 3D position, and/or other information. The descriptors may be determined by a computer vision technique including one or more of BRISK, ORB, SIFT, SURF, and/or other techniques. The quantifier of uncertainty may include a covariance matrix and/or other quantifier.

A keyframe may be related to a point of view within an individual local environment, defining a field of view within the individual local environment. The point of view may include an orientation and/or position within the location with respect to one or more degrees of freedom. In some implementations, point of view may be defined with respect to 6 degrees of freedom. In some implementations, the point of view in a location may be determined by a pose of a headset in the location. By way of non-limiting illustration, a keyframe may be specified by one or more of a point of view, a quantifier of an uncertainty regarding the point of view, one or more images captured within a field of view at the point of view, a set of keypoints visible within the one or more images, a timestamp associated with the generation of the keyframe, a GPS coordinate associated with the generation of the keyframe (e.g., derived from sensors of a headset), and/or other information. The quantifier of the uncertainty regarding the point of view may include a covariance matrix and/or other quantifier of the uncertainty regarding the point of view. The field of view may be determined based on a field of view of an image sensor.

A co-visibility graph may include individual sets of pairs of keyframes which may share significant subsets of feature points. "Significant" may denote having 80% or more commonly shared subsets of feature points within the images of the keyframes, and/or other percentages and/or quantities.

In some implementations, the location of users within the interactive space may be determined. By determining and/or tracking the location, an estimate of the user's trajectory may be made to facilitate the accurate generation and/or placement of images forming virtual content to create the interactive space. The process of determining and/or tracking the location of a user within a location with respect to one or more reference points (e.g., a coordinate system origin and/or other fixed reference points) may be referred to as "localization."

Techniques to generate environmental records and/or perform localization may include one or more of simultaneous localization and mapping (SLAM), parallel tracking and mapping (PTAM), particle filter localization, image registration, stereophotogrammetry, Speeded Up Robust Features (SURF), Scale-Invariant Feature Transform (SIFT), Oriented FAST (Features from Accelerated Segment Test) and rotated BRIEF (Binary Robust Independent Elementary Features) (ORB), Binary Robust Invariant Scalable Keypoints (BRISK), and/or other techniques. These techniques may utilize, as input, sensor readings from various sensors including one or more of image sensors, depth sensors, orientation sensors, location sensors, and/or other sensors.

When users collaborate in interactive spaces (e.g., synchronously, asynchronously, and/or collaborate in other ways), it may be desired to have consistent environmental records. "Consistent" may refer to the records having one or more of the same or similar specification of dimensions of a local environment, same or similar specification of features and/or locations of features present in the local environment, a same or similar reference point and/or sets of reference points, and/or other information. For example, if two collaborating users utilize local environmental records that are not consistent, the perception of virtual objects may differ between the users (e.g., images forming the virtual object may not be properly placed over the user's view of the real world). In some implementations, differences between local environmental records generated individually by different headsets may be due to inaccuracies (e.g., error) that may be inherent to the generation of location compositions at the headsets and/or the propagation of such inaccuracies over time (e.g., accumulated error). In these cases, interactions of one user may not appear as being smooth or accurate to the other user. In some cases, collaboration between the users may not be possible at all. These issues greatly hinder the ability to perform collaborative interactions in an AR/VR space, and make a system that enables the sharing of a master environmental record among multiple users highly-desirable.

In FIG. 1, one or more features and/or functions of system 100 presented herein may provide a solution to these and/or other issues via an environmental record server 126 that creates, stores, and/or updates an environmental record of a real-world environment. The environmental record may utilize one or more fixed reference points. The real-world environment may include a set of local environments. The environmental record may be generated based on user participation in system 100, where information generated by individual headsets at individual local environments may be collected by environmental record server 126 to generate and/or update an environmental record. The environmental record may specify location compositions of individual local environments determined to be "fixed" within the individual local environments, referred to as "archival location compositions" of the individual local environments. "Fixed" in this sense may refer to information about the local environments which, over time, may have consistently been recognized and/or identified within the individual local environments. The archival location composition for an individual local environment may include one or more of a fixed reference point (e.g., coordinate system origin), descriptions of objects and/or surfaces present in the location (e.g., the keypoints, keyframes, and/or other information) which, over time, may have continued to be detected within the local environment, and/or other information. It is noted that the term "fixed" may not be intended to mean fixed indefinitely, as information attributed as being "fixed" may change and/or be updated. In some implementations, the term "canonical" may be used to refer to information attributed as being "fixed."

When a user of a headset enters a local environment, the user's headset may download a portion of an environmental record for that local environment (e.g., an archival location composition for that local environment). The user's headset may generate a current location composition of the local environment based on sensor output, GPS location-based information, the downloaded portion of the environmental record, and/or other information. The headset may be configured to determine differences between the downloaded portion of the environmental record and the current location composition. The differences may be sent to environmental record server 126 and used to update the environmental record at the environmental record server 126. The updates for an environmental record may include one or more of changes to the individual archival location compositions for individual local environments, and/or other information. Changes may include one or more of addition of information, removal of information, and/or modification of currently stored information. Further, once the differences are determined at the individual headsets, the individual headsets may generate local environmental records for the current local environments they are present in. A local environmental record may include information from one or both of the current location composition and the archival location composition of the local environment. The local environmental record may be used by the headset during participation in the interactive space.

In FIG. 1, system 100 may include one or more of environmental record server 126, one or more headsets (e.g., a headset 102 and/or one or more other headsets 121), and/or other components. The system 100 may be configured to provide a consistent and up-to-date environmental record for access by multiple users. The environmental record may be created at, stored, and/or updated by environmental record server 126. The updates may reflect changes to individual local environments as determined by individual headsets.

In some implementations, one or more components of system 100 may be included with and/or otherwise held by headset 102. By way of non-limiting illustration, headset 102 may include and/or may be coupled with one or more of one or more physical processors 104, one or more image-forming components 114, one or more sensors 118, and/or other components. The headset 102 may be configured to be installed (e.g., worn) on a head of a user. By way of non-limiting illustration, headset 102 may include one or more of a head-mounted display (HMD) (see, e.g., FIG. 5), glasses, and/or other devices.

In some implementations, one or more components of system 100 may be included in one or more devices external to headset 102. For example, one or more components may be included in one or more of a desktop computer, a laptop computer, other mobile computer configurations, and/or other devices. By way of non-limiting illustration, one or more physical processors 104 and/or other components may be included in a mobile computing device external to headset 102. The headset 102 may be tethered and/or otherwise connected to the one or more external devices. Such connection may be wired (e.g., USB and/or other wired connection) and/or wireless (e.g., Bluetooth, Wi-Fi, and/or other wireless connection).

Figure 5:
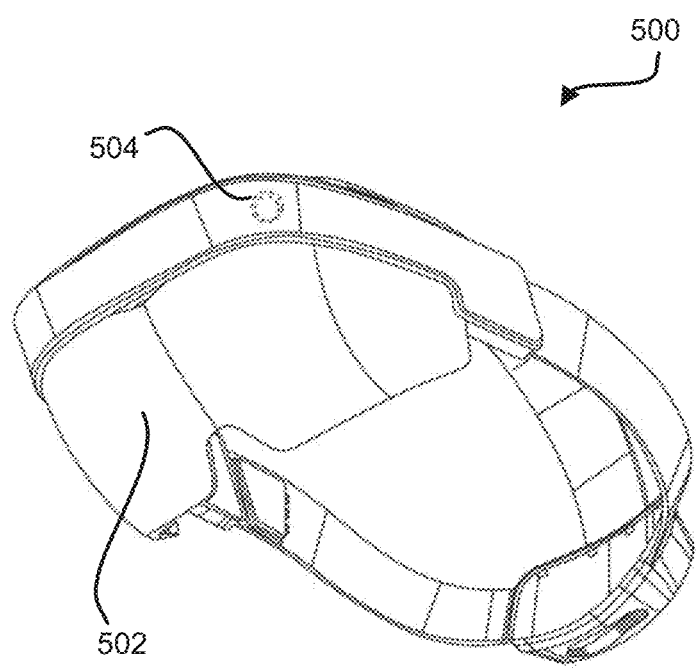
FIG. 5 illustrates an exemplary head-mounted display.

Referring now to FIG. 5, in some implementations, a display device (e.g., the headset 102 in FIG. 1) may comprise an HMD 500. One or more components of system 100 (FIG. 1) may be held by and/or comprise part of HMD 500. By way of non-limiting illustration, an optical element of an image-forming component may comprise at least part of a visor portion 502 of HMD 500. Other components including physical processors, light sources of image-forming components, one or more sensors, and/or other components, may be incorporated into a housing portion 504 and/or other portions of HMD 500.

Returning to FIG. 1, one or more sensors 118 of headset 102 may include one or more of a depth sensor, an image sensor, a location sensor, an orientation sensor and/or other sensors.

A depth sensor may be configured to generate output signals conveying depth information and/or other information. Depth information may include distance and/or range, of real-world surfaces and/or objects from the depth sensor, and/or other information. In some implementations, depth information may be provided in the form of a point cloud. A point cloud may include a set of points. Individual points may represent individual surfaces within the real world. The depth information may specify, for individual points, one or more of an individual distance of the point from the depth sensor, an individual orientation of the point with respect to the depth sensor, and/or other information. In some implementations, identification of presence of an object and/or surface, shape of an object and/or surface, orientation of an object and/or surface, identification of an object and/or surface, and/or other information may be determined from depth information. The depth information may further facilitate tracking of objects and/or surfaces over time. In some implementations, a depth sensor may comprise one or more of a time-of-flight sensor, a structured light sensor, an unstructured light sensor, an active stereo pair, a passive stereo pair, and/or other depth sensing devices.

An image sensor may be configured to generate output signals conveying visual information and/or other information. Visual information may specify visual content within a field of view of the image sensor. The visual content may include real-world objects and/or surfaces present in the real world. The visual information may specify visual content in the form of pixels in an image. Pixels may be defined by one or more of location (e.g., two-dimensional coordinates), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

A location sensor may be configured to generate output signals conveying geo-location of the location sensor. A location sensor may include one or more of a global positioning system (GPS), and/or other location sensors. In some implementations, geo-location may be determined using WIFI SSIDs for location tracking in GPS denied environments (e.g. indoors). This may facilitate use of GPS (when available) to correlate WIFI SSIDs to specific locations.

An orientation sensor may be configured to generate output signals conveying position and/or orientation information. The position and/or orientation information may specify position and/or orientation of headset 102 over time. The orientation sensor may include an inertial measurement unit (IMU) and/or other sensors. In some implementations, position and/or orientation may be specified with respect to 6 degrees of freedom.

In FIG. 1, individual image-forming components of one or more image-forming components 114 may be configured to generate light rays to form images of virtual content. Virtual content may be perceived within a viewing user's field-of-view. Virtual content may be focused at one or more focal planes. The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form or perceive coherent virtual content. As a result, the properties of the human perception may be exploited through visual systems, as described herein, employing hardware and/or software architectures to form virtual content (e.g., digital images) that may be located and/or perceived to be located in the real-world environment by virtue of neuroscience principles.

Individual ones of one or more image-forming components 114 may include one or more of one or more light sources, one or more optical elements, and/or other components. In some implementations, an individual light source may be arranged on a headset to direct light rays toward one or more optical elements. The one or more image-forming components 114 may be configured such that images of virtual content may be superimposed over a view of the real world to create an interactive space. In some implementations, images may be presented individually to each eye of the user as stereo image pairs.

A light source may comprise one or more of a microelectromechanical systems (MEMS), RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources.

It is noted that the use of the term "light ray" is not intended to limit the scope of the disclosure to single, discrete, photons and/or packets of photons. Instead, the disclosure may envision a light ray to mean a light beam comprising multiple and/or continuous photons, in one or more implementations.

In some implementations, one or more optical elements of one or more image-forming components 114 may be arranged on headset 102 such that, when headset 102 is installed on the head of a user, the user's gaze may be directed toward the one or more optical elements. In some implementations, an optical element may form at least part of a portion of headset 102 through which a user may view the real world. In some implementations, an optical element may comprise one or more reflective and/or partially reflective surfaces. An optical element may be formed from a reflective and/or partially reflective material. An optical element may be formed from a transparent and/or partially transparent material. A material of an optical element may comprise one or more of ZEONEX, Cyclo Olefin Polymer (COP), Cyclic Olefin Copolymer (COC), polycarbonate, Poly (methyl methacrylate) (PMMA), and/or other materials.

In some implementations, one or more optical elements of one or more image-forming components 114 may be arranged on headset 102 such that, when headset 102 is installed on the head of the user, light rays generated by one or more light sources may be directed onto the one or more optical elements to form images of virtual content on the one or more optical elements. The images of virtual content on the one or more optical elements may be superimposed over the user's view of the real world through the one or more optical elements to create an interactive space.

In some implementations, an optical element may comprise one or more of a waveguide, optical coupling features, off-axis optics, and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or both eyes of a user. A waveguide may be formed from holographic-polymer dispensed liquid crystal, and/or other materials In some implementations, an optical element may comprise a planar partial mirror array waveguide and/or other components. The light rays from a light source may be coupled into the waveguide at an entrance of the waveguide, and propagated to a partial mirror array region of the waveguide by total internal reflection. The light rays may be reflected by the partial mirror array and directed toward the user's eye.

In some implementations, one or more optical elements of one or more image-forming components 114 may be arranged on headset 102 such that light rays generated by one or more light sources may be directed at the one or more optical elements, coupled into the one or more optical elements, and directed out of the one or more optical element into an eye of a user. The images of virtual content may be projected onto a retina of an eye such that the images may be superimposed over the user's view of the real world.

Figure 3:
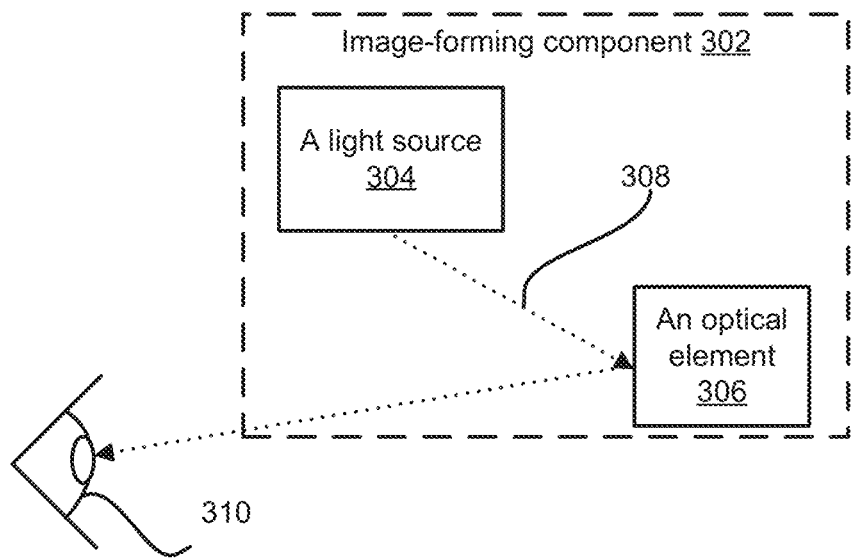
FIG. 3 illustrates a configuration of an image-forming component comprising a light source and an optical element, in accordance with one or more implementations.

FIG. 3 illustrates an implementation of an image-forming component 302. The image-forming component 302 may include one or more of a light source 304, an optical element 306, and/or other components. The light source 304 may be configured to emit light rays forming images, including light ray 308. The optical element 306 may be configured to receive the light rays generated by light source 306. The optical element 306 may be configured to provide the light rays to an eye 310 to present the images over an angular portion of a user's field-of-view. Light rays from an ambient environment may pass through optical element 306 and reach eye 310.

Figure 4:
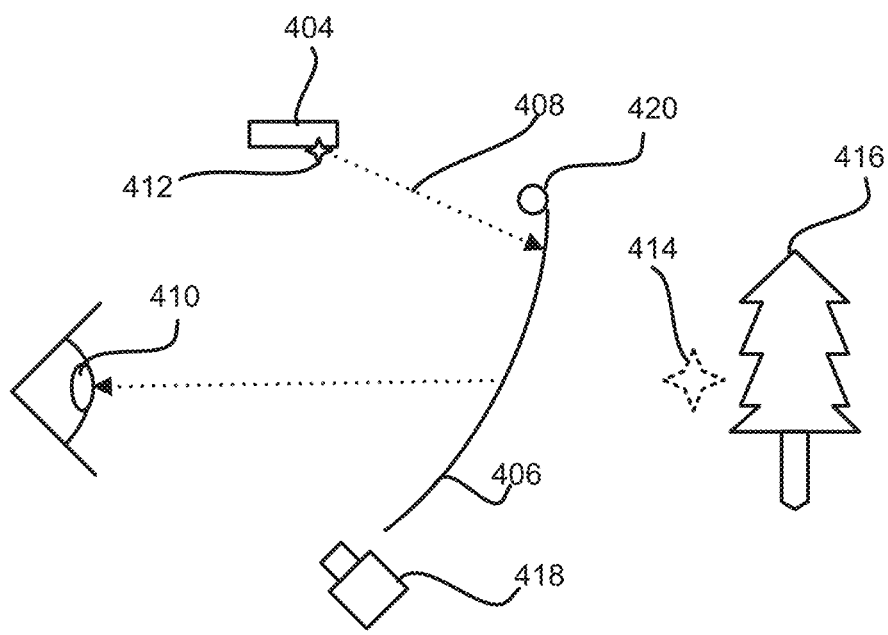
FIG. 4 illustrates a configuration of a light source and an optical element of an image-forming component, in accordance with one or more implementations.

FIG. 4 illustrates a configuration of a light source 404 and an optical element 406 of an image-forming component, in accordance with one or more implementations. The optical element 406 may comprise, and/or may be part of, a visor portion of a headset. The light source 404 may be configured to emit light rays, including light ray 408. The light rays may form images, including image 412. The light rays may be received by optical element 406 and provided to an eye 410 of a user. The light rays received by eye 410 may form virtual content 414 (e.g., a virtual object) perceived to lie within three-dimensional space in the user's field of view. The virtual content 414 may be superimposed over the user's view of real-world objects, including real-world object 416.

The implementation of a single image-forming component to provide light rays to an eye of a user as shown in FIG. 3 and FIG. 4 may be limited in the field of view over which virtual content may be presented. One or more implementations of system 100 presented herein may utilize a set of image-forming components to provide sets of images to individual eyes. Individual image-forming components in a set of image-forming component may be configured to direct light rays over a specified angular portion of a user's field of view. For example, utilizing at least two image-forming components per eye may facilitate providing a first set of light rays over a first angular portion of the user's field of view corresponding to central vision and a second set of light rays over a second angular portion of the user's field of view corresponding to peripheral vision.

In FIG. 1, one or more of processor(s) 104, one or more image-forming components 114, one or more sensors 118, and/or other components may be operatively linked via one or more electronic communication links. For example, such electronic communication links may be established, at least in part, via network(s) 116. Network(s) 116 may comprise one or both of wired and/or wireless communications. It will be appreciated that this is not intended to be limiting and that the scope of this disclosure includes implementations in which one or more of processor(s) 104, one or more image-forming components 114, one or more sensors 118, and/or other components may be operatively linked via some other communication media.

In FIG. 1, one or more physical processors 128 of environmental record server 126 may be configured by machine-readable instructions 130. Executing machine-readable instructions 130 may cause one or more physical processors 128 to facilitate generating an environmental record within an interactive space. The machine-readable instructions 130 may include one or more of an input component 132, an environmental record component 134, an update component 136, a transmission component 138, and/or other components.

The input component 132 may be configured to obtain information from one or more headsets. The information obtained from the one or more headsets may facilitate creating an environmental record, storing an environmental record, and/or updating an environmental record stored by environmental record server 126. The information obtained from the one or more headsets may include one or more of sensor output from one or more sensors coupled to individual headsets, local environmental records generated by individual headsets currently present at individual local environments, information indicating discrepancies, or differences, between a currently stored environmental record and location compositions currently being generated by the one or more headsets (see, e.g., update component 111 of one or more physical processors 104 of headset 102), and/or other information.

The environmental record component 134 may be configured to effectuate storage of an environmental record. The environmental record may be stored in non-transitory electronic storage 140 and/or other storage locations.

The environmental record may include a set of archival location compositions for a set of local environments. As presented herein, an archival location composition may be specified by one or more of a set of keypoints, a set of keyframes, a co-visibility graph, and/or other information about a local environment determined over time, stored, and/or updated within the environmental record.

By way of non-limiting illustration, a feature point specified in an archival location composition of a local environment may be a point on a surface of an object previously determined to be present in the location. The position of this feature point in space, a descriptor of the feature point, and/or other information specified in the archival location composition may provide a technique to identify presence of the object and/or describe the object or a portion of the object. By way of further non-limiting illustration, a set of feature points may include points lying on a surface of a table. Based on a set of keypoints specifying information related to these set of feature points, an identification of presence of the table and/or description of the object as a "table" (and/or other information describing the object) may be made. Other information describing the table may include one or more of dimensions of the table, location of the table (e.g., relative a reference), a distance of the user from the table, distance of the table from one or more other objects, and/or other information. Object identification and/or description may be facilitated by one or more computer vision techniques, and/or other techniques.

In some implementations, keypoints, keyframes, and other information included in an environmental record may be a result of one or more SLAM operations and/or one or more other operations performed using output from one or more sensors 118 and/or other information. The positions and/or orientations may be localized relative to landmarks in the environment and/or individual local environments (e.g., one or more fixed reference points). The one or more fixed reference points may include one or more of the feature points specified by one or both of the keypoints and/or keyframes of a location composition.

In some implementations, a portion of an environmental record specifying an archival location composition for a specific local environment may specify the archival location composition with an assumption that the information may be "fixed" within the local environment. "Fixed" in this sense may refer to information about an individual local environment which, over time, may have consistently been recognized and/or identified within the individual local environment, and therefore "archived" within the specification of the environmental record. The fixed information for an individual local environment may include one or more of a set of fixed reference point (e.g., coordinate system origin), keyframes, and/or keypoints which, over time, may have the same or similar specification, and/or other information. It is noted that the term "fixed" may not be intended to mean fixed indefinitely, as information attributed as being "fixed" may change and/or be updated.

By way of non-limiting illustration, a real-world environment may include a first local environment and/or other local environments. The environment may have an associated environmental record. A portion of the environmental record may be specific to the first local environment and describe aspects of the first local environment. The portion of the environmental record describing aspects of the first local environment may include an archival location composition for the first local environment. The archival location composition may include a description of a set of one or more objects and/or surfaces previously determined to be present in the first local environment. The description of the set of one or more objects and/or surfaces previously determined to be present in the first local environment may be specified as one or more of a set of keypoints, a set of keyframes, a co-visibility graph, and/or other information.

The update component 136 may be configured to determine updates for a stored environmental record based on information obtain by input component 132 and/or other information. Based on determined updates, update component 136 may be configured to instruct environmental record component 134 to effectuate the updates for a stored environmental record. Update instructions may include one or more of commands, processes, programs, routines, and/or other information. In some implementations, update instructions may include instructions for performing global bundle adjustment and/or other operations.

In some implementations, the updates determined by update component 136 may include changes to an environmental record (and/or portions thereof) as related to what may be considered "fixed" within a given location. In some implementations, changes may include one or more of removing information, adding information, modifying information, and/or other changes. In some implementations, update component 136 may be configured to determine updates based on obtaining, from individual headsets, information indicating differences between current location compositions of the local environments and the archival location compositions of the local environments. Additional descriptions of determining updates are presented in more detail herein.

In some implementations, updates to an environmental record may be based on receiving output signals from depths sensors coupled to individual headsets (e.g., depth information) and/or other information. The update component 136 may be configured to utilize depth information to perform one or more of identification of presence of objects and/or surfaces, shapes of objects and/or surfaces, orientations of objects and/or surfaces, identification of objects and/or surfaces (e.g., determine what an object and/or surface is), and/or perform other operations based on receiving depth information. By way of non-limiting illustration, interior walls and/or surfaces may be identified, presence of objects may be identified, and object positions may be tracked. The updates determined based on depth information may be utilized in addition to, or alternatively to, the updates determined based on keypoints and/or keyframes. In some implementations, the operations of identification of presence of objects and/or surfaces, shapes of objects and/or surfaces, orientations of objects and/or surfaces, identification of objects and/or surfaces (e.g., determine what an object and/or surface is), and/or other operations may be performed using visual information determined from output signals of image sensors (e.g., the visual information defining images of the real world). In particular, object-tracking and recognition software may be utilized to perform one or more of these operations using visual information.

It is noted that in some implementations where an environmental record for an environment has not be created, the update component 136 may be configured to generate an environmental record based on information obtained by input component 132 and/or other information. If no reference point has been specified, then one or more reference points used by a headset for a local environmental record may be set as a fixed reference point during creation of the environmental record.

The transmission component 138 may be configured to effectuate transmission of a stored environmental record and/or individual portions of the environmental record to one or more headsets. In some implementation, the transmission of a stored environmental record and/or portion of the environmental record may be in response to a request for such information from an individual headset. In some implementations, a request from the headset may include a GPS coordinate of the headset so transmission component 138 may appropriately determine the portion of the environmental record corresponding to the current GPS coordinate of the headset to transmit In FIG. 1, one or more physical processors 104 of headset 102 may be configured by machine-readable instructions 106. Executing machine-readable instructions 106 may cause one or more physical processors 104 to facilitate generating an environmental record for an interactive space. The machine-readable instructions 106 may include one or more of an input component 108, a local environment component 110, an update component 111, and/or other components. It is noted that while some descriptions may be directed to headset 102, this is for illustrative purposes only and is not to be considered limiting as individual ones of one or more headsets 121 may be similarly configured.

The input component 108 may be configured to obtain information for generating local environmental records and/or other information for performing other operations.

The input component 108 may be configured to obtain one or more of sensor output from one or more sensors 118, information from environmental record server 126 (e.g., via transmission component 138), and/or other information. The sensor output from one or more sensors 118 may include one or more of sensor output from a depth sensor, sensor output from an image sensor, sensor output from an orientation sensor, and/or other output from other sensors or cameras. The information from environmental record server 126 may include one or more of an environmental record, a portion of the environmental record corresponding to a current geo-location of headset 102, and/or other information.

In some implementations, input component 108 may be configured to transmit a request to environmental record server 126 to obtain information from environmental record server 126. By way of non-limiting illustration, to obtain a portion of an environmental record corresponding to a current geo-location of headset 102, input component 108 may be configured to send a request to environmental record server 126 including the current geo-location of headset 102. In some implementations, the environmental record server 126 may request the current geo-location of headset 102.

The local environment component 110 may be configured to generate individual local environmental records of individual local environments within a real-world environment. The local environment component 110 may utilize information obtained by input component 108 and/or other information. The local environment component 110 may generate a local environmental record using techniques such as one or more of simultaneous localization and mapping (SLAM), parallel tracking and mapping (PTAM), particle filter localization, image registration, stereophotogrammetry, and/or other techniques.

In some implementations, obtaining a portion of an environmental record may provide local environment component 110 with one or more fixed reference points (e.g., utilized in the environmental record), and/or other information as currently specified in the environmental record. In some implementations, local environment component 110 may be configured to download a portion of the environmental record corresponding to a current location, discard information included in the downloaded portion that may not be consistent with information derived from current sensor output (e.g., a current location record including one or more of keypoints, keyframes, and other information derived from sensor output), and/or generate the current local environmental record based on information included in the current location composition and the (non-discarded) information from the downloaded portion of the environmental record.

In some implementations, generating a local environmental record may include generating a current location composition based on output signals from one or more sensors 118 and/or comparing that to an archival location composition for the local environment. Some of the information (e.g., keypoints, keyframes, and/or other information) generated by the local environment component 110 based on output signals of one or more sensors 118 may be the same as or similar to information included in the portion of the environmental record downloaded from environmental record server 126 (e.g., the archival location composition). When information is the same and/or within a threshold difference, the local environment component 110 may discard the sensor output and use the information included in the archival location composition. When information does not match and/or is outside a threshold difference, local environment component 110 may discard the information included in the archival location composition, and use information in the current location composition. The processes of one or more of i) determining differences between the information included in the downloaded portion of the environmental record (e.g., an archival location composition) and the current location composition derived from current sensor output, determining what information to include in the local environmental record (e.g., information derived by sensor output and/or information included in the downloaded portion of the environmental record), and/or compiling information indicating the differences to send to environmental record server 126 may be performed by update component 111.

The update component 111 may perform one or more of the above processes by comparing a current location composition and an archival location composition for a local environment and/or by performing other operations. By way of non-limiting illustration, update component 111 may be configured to compare one or more of keypoints, keyframes, and/or other information included in the current location composition with one or more of keypoints, keyframes, and/or other information included in the downloaded archival location composition. Such comparisons may facilitate determining whether one or more objects are the same, have been moved (changed position in the environment and/or changed orientation in the environment), have been removed (are no longer present in the environment), and/or have been added to the current local environment (are now present in the environment) as compared to the understanding of objects and/or surfaces previously determined to be present in the local environment as specified by the environmental record.

For illustrative purposes, consider an archival location composition defining aspects of a first local environment including a description of a first set of one or more objects and/or surfaces previously determined to be present in the first local environment (e.g., in the form of keypoints, keyframes, and/or other information). A current location composition for the first local environment may define aspects of the first local environment including a description of a second set of one or more objects and/or surfaces currently present in and/or moving through the first local environment (e.g., in the form of keypoints, keyframes, and/or other information).

In some implementations, determining differences between the current location composition and the archival location composition comprises comparing the description of the first set of one or more objects and/or surfaces with the description of the second set of one or more objects and/or surfaces. This may include comparing keypoints, keyframes, and/or other information included in the archival location composition with keypoints, keyframes, and/or other information included in the current location composition. For example, comparing keypoints may include one or more of determining keypoints that share the same descriptor and comparing the locations of those keypoints, determining keypoints having the same location and comparing the descriptors for those keypoints, and/or other comparisons. Comparing keyframes may include determining keyframes that are related to the same point of view and comparing the one or more images captured at the point of view, determining keyframes that are related to the same point of view and comparing the individual sets of keypoints visible within the one or more images captured at the point of view, and/or other comparisons.

In some implementations, based on the comparison, it may be determined whether the first set of one or more objects and/or surfaces previously determined to be present in the first local environment are currently present in the first local environment. This may include, based on comparing keypoints and/or keyframes specified in the archival location composition with keypoints and/or keyframes specified in the current location composition, determining whether the keypoints and/or keyframes (or subsets thereof) specified in the current location composition are the same as, or similar to, the keypoints and/or keyframes specified in the archival location composition. This comparison may be related to determining whether objects and/or surfaces previously determined to be present have been removed, moved, and/or changed in other ways.

In some implementations, responsive to determining that the first set of one or more objects and/or surfaces previously determined to be present in the first local environment are currently present in the first local environment, update component 111 may be configured to determine there are no changes to the first set of one or more objects and/or surfaces previously determined to be present in the first local environment. In this case, local environment component 110 may utilize the information included in the archival location composition (e.g., the description of the first set of one or more objects and/or surfaces previously determined to be present in the first local environment) in the specification of a local environmental record for the first local environment utilized by headset 102 during participation in the interactive space.

In some implementations, responsive to determining that at least some of the objects and/or surfaces included in the first set of one or more objects and/or surfaces previously determined to be present in the first local environment are not currently present in the first local environment, update component 111 may be configured to generate information indicating which objects and/or surfaces are no longer present in the first local environment. In some implementations, the information indicating which objects and/or surfaces are no longer present in the first local environment may be in the form of keypoints and/or keyframes related to those objects and/or surfaces. In some implementations, the information indicating which objects and/or surfaces are no longer present in the first local environment may comprise at least part of the information indicating differences between the current location composition and the archival location composition which may be transmitted to environmental record server 126.

In some implementations, based on the comparison, it may be determined whether the second set of one or more objects and/or surfaces currently present in the first local environment includes one or more objects and/or surfaces that were not previously present in the first local environment, or one or more objects and/or surfaces that may have changed position or orientation from their previous positions or orientations in the first local environment. This may include, based on comparing keypoints and/or keyframes specified in the archival location composition with keypoints and/or keyframes specified in the current location composition, one or more of determining whether the keypoints and/or keyframes (or subsets thereof) specified in the current location composition are different from (e.g., not the same as) the keypoints and/or keyframes specified in the archival location composition and/or identifying those keypoints and/or keyframes that are different. This comparison may be related to determining whether there are currently one or more new objects and/or surfaces that were not previously known to be present in the first local environment.

In some implementations, responsive to determining that the second set of one or more objects and/or surfaces currently present in the first local environment does include objects and/or surfaces that were not previously present in the first local environment, update component 111 may be configured to generate information describing the objects and/or surfaces that were not previously present in the first local environment. The information describing the objects and/or surfaces that were not previously present in the first local environment may be in the form of keypoints and/or keyframes associated with those objects and/or surfaces. In some implementations, the information describing the objects and/or surfaces that were not previously present in the first local environment may comprise at least part of the information indicating differences between the current location composition and the archival location composition which may be transmitted to environmental record server 126. In this case, local environment component 110 may utilize the information describing the objects and/or surfaces that were not previously present in the first local environment in the generation of a local environmental record for the first local environment utilized by headset 102 during participation in the interactive space.

In some implementations, update component 111 may be configured to determine there are no additions to the archival location composition of the first local environment. In some implementations, a determination that no additions may be made responsive to determining that the second set of one or more objects and/or surfaces currently present in the first local environment does not include objects and/or surfaces that were not previously present in the first local environment. In this case, local environment component 110 may utilize the information included in the archival location composition (e.g., the description of the first set of one or more objects and/or surfaces previously determined to be present in the first local environment) in the generation of a local environmental record for the first local environment. The update component 111 may be configured to effectuate transmission of information determined by update component 111 to environmental record server 126.

It is noted that in some implementations, one or more of the features and/or functionality of update component 111 of headset 102 may be attributed to update component 136 of environmental record server 126. By way of non-limiting illustration, environmental server 126 may be configured to receive information from headset 102, and to utilize one or more physical processors 128 to perform the functionality of update component 111. More specifically, update component 136 of environmental record server 126 may be configured to determine the information indicating differences between a current location composition of an individual local environment and an archival location composition for the individual local environment.

Referring to environmental record server 126, responsive to input component 132 obtaining (e.g., by receiving it from headset 102 and/or determining it locally) information indicating differences between a current location composition of an individual local environment and an archival location composition for the individual local environment, update component 136 may be configured to determine updates for a stored environmental record. Updates to the environmental record may include one or more of performing global bundle adjustment to incorporate the obtained information, performing compression and/or remapping, performing one or more preprocessing procedures, computing and/or propagating uncertainty estimates, culling information whose provenance may be too dynamic, and/or other operations.

In some implementations, compression and/or remapping may be performed to facilitate an efficient lookup and/or storage of keypoints (e.g., via a lookup table), co-visibility graphs and/or subgraphs, keyframes for place recognition, and/or other operations.

In some implementations, uncertainty estimates may be due one or more of changes in local environments over time (e.g., by virtue of one or more of dynamic environments, daily light cycles, seasonal changes, and/or other information), sensor error (e.g., GPS data less sensitive to altitude), model error, and/or other information.

In some implementations, culling information whose provenance may be too dynamic may include identifying objects that may be problematic for one or more reasons. For example, objects that may be problematic may include transient objects (e.g., animals), inappropriate objects (e.g., age inappropriate objects, such as a beer sign), sets of densely packed objects (e.g., a crowd of people), and/or other objects.

The update component 136 may be configured to determine, from information obtained by input component 132, what information to incorporate into the individual archival location compositions of an environmental record. In some implementations, changes indicating removal and/or movement (e.g., location change) of one or more objects and/or surfaces previously determined to be present within individual local environments may be incorporated into the individual archival location compositions of the individual local environments included in the environmental record. For example, one or more of keypoints and/or keyframes specified in an individual archival location composition may be updated based on received information indicating respective changes to the same.

In some implementations, update component 136 may be configured to, based on obtaining information indicating differences between individual current location compositions of individual local environments and individual archival location compositions of the individual local environments that includes information describing new objects and/or surfaces (e.g., not previously included in the individual archival location compositions), determine what information should be considered "fixed" within the individual local environments and therefore suitable to add to the individual archival location compositions. If it is determined that information is to be considered fixed, the environmental record (or portion thereof) may be updated to include this information (e.g., via global bundle adjustment and/or other techniques). If it is determined that information is not to be considered fixed, the environmental record may not be updated.

In some implementations, update component 136 may be configured to determine what information should be considered "fixed" and therefore added to the individual archival location compositions by monitoring the information obtained by input component 132 over time. If information describing new objects and/or surfaces present in a local environment is obtained consistently, this may provide an indication of the new objects and/or surfaces being non-transient objects and/or surfaces within the local environment and therefore suitable for inclusion in an archival location composition for the local environment. The update component 136 may be configured to instruct environmental record component 134 to effectuate updates for a stored environmental record accordingly. If information describing new objects and/or surfaces present in a local environment is inconsistently obtained, this may provide an indication of the new objects and/or surfaces being transient objects and/or surfaces within the local environment and therefore unsuitable for inclusion in an archival location composition for the local environment.

In some implementations, "consistent" may refer to one or more measures meeting and/or exceeding a given threshold. By way of non-limiting illustration, the measures may include one or more of a frequency at which the information describing new objects and/or surfaces is obtained from one or more headsets, a quantity of headsets that send the information describing new objects and/or surfaces, a duration over which the information describing new objects and/or surfaces is obtained, and/or other measures.

By way of non-limiting illustration, if the frequency at which the information describing new objects and/or surfaces is obtained from one or more headsets meets or exceed a threshold frequency, then the archival location composition may be updated to include the description of the new objects and/or surfaces. The threshold frequency may include, for example, one or more of one to five times per day, five to twenty times per week, and/or other frequency.

By way of non-limiting illustration, if the quantity of headsets that send the information describing new objects and/or surfaces meets or exceed a threshold quantity, then the archival location composition may be updated to include the description of the new objects and/or surfaces. The threshold quantity may include, for example, two to ten headsets, and/or other quantities.

By way of non-limiting illustration, if the duration over which the information describing new objects and/or surfaces is obtained from a given headset meets or exceeds a threshold duration, then the archival location composition may be updated to include the description of the new objects and/or surfaces. The threshold duration may include, for example, one to two hours, and/or other durations.

Figure 6:
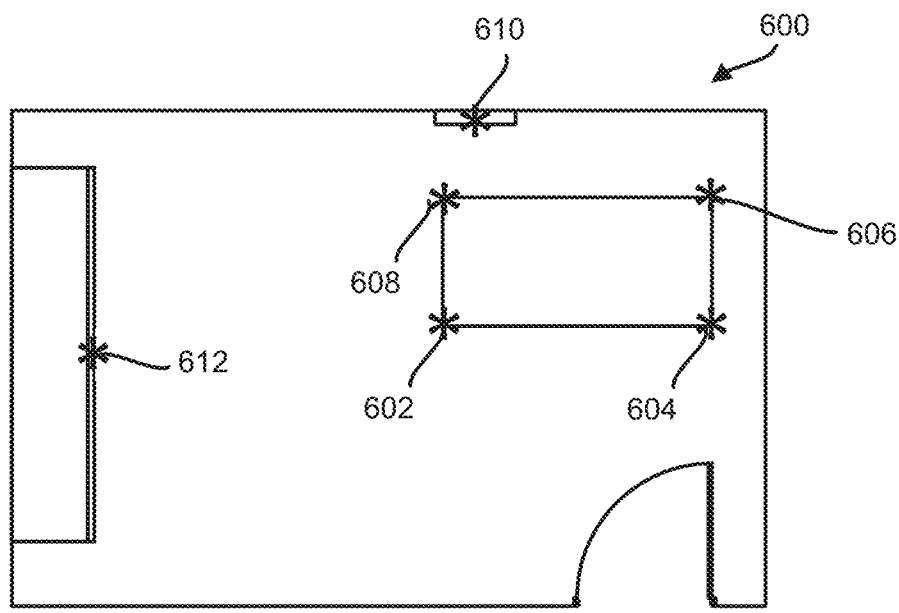
FIG. 6 shows a graphical illustration of an archival location composition of a location.

FIG. 6 shows a graphical illustration of an archival location composition 600 of a local environment. The local environment may comprise a room. FIG. 6 illustrates a top-down view. By way of non-limiting illustration, the graphical illustration may represent the archival location composition 600 as specified by a currently stored environmental record. The archival location composition 600 may include a set of keypoints, a set of keyframes, and/or other information. Here, the set of keypoints may be associated with a set of feature points ducted in the local environment. The set of feature points are illustrated as one or more of a first feature point 602, a second feature point 604, a third feature point 606, a fourth feature point 608, a fifth feature point 610, a sixth feature point 612, and/or other keypoints. In some implementations, the set of keypoints associated with the set of feature points may be assumed to be "fixed" within the local environment. Individual keypoints associated with individual features detected in the local environment which may correspond to one or more objects and/or surfaces previously determined to be present in the local environment. The one or more objects and/or surfaces may include one or more of a table (e.g., first feature point 602, second feature point 604, third feature point 606, a fourth feature point 608), a wall-mounted clock (e.g., fifth feature point 610), a cabinet (e.g., sixth feature point 612), walls, a ceiling, a floor, and/or other objects and/or surfaces.

Figure 7:
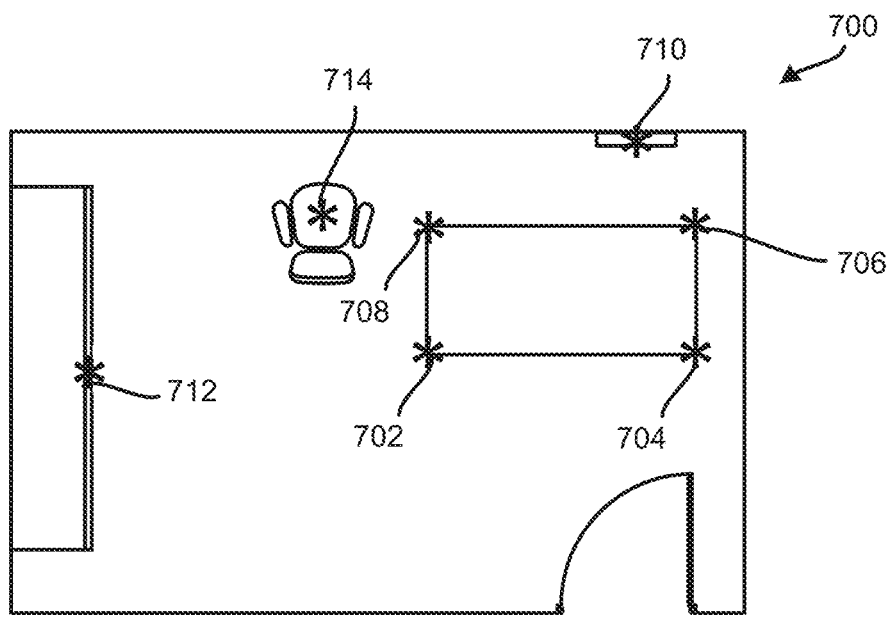
FIG. 7 shows a graphical illustration of a current location composition of the location.

FIG. 7 shows a graphical illustration of a current location composition 700 of the local environment of FIG. 6, again showing a top-down view. By way of non-limiting illustration, the graphical illustration may represent current location composition 700 as determined by current output signals from one or more sensors of a headset. The current location composition 700 may include a set of keypoints, a set of keyframes, and/or other information. Here, the set of keypoints may be associated with a set of feature points detected in the local environment. The set of feature points may include one or more of a seventh feature point 702, an eighth feature point 704, a ninth feature point 706, a tenth feature point 708, an eleventh feature point 710, a twelfth feature point 712, a thirteenth feature point 714, and/or other keypoints. Individual keypoints associated with individual features detected in the local environment which may correspond to one or more objects and/or surfaces previously determined to be present in the local environment. The one or more objects and/or surfaces may include one or more of a table, a wall-mounted clock, a cabinet, a desk chair, walls, a ceiling, a floor, and/or other objects and/or surfaces.

The archival location composition 600 of FIG. 6 may be compared to current location composition 700 of FIG. 7 to determine difference between the two and update the environmental record. As shown, the keypoints representative of the table and the cabinet may be the same, while a location associated with the keypoint representative of the wall-mounted clock may have changed, and a new keypoint (e.g., corresponding to thirteenth feature point 714) representative of a newly present object (e.g., a desk chair) may be determined. Over time, as additional current location compositions are obtained, it may be determined whether the keypoint representative of the wall-mounted clock should be updated within the environmental record to reflect the new location, and/or whether the new object should be considered fixed and therefore included in an archival location composition. Most likely, the presence of a chair may be considered transient (e.g., people move chairs around quite often), and may not be included in an environmental record. Further, the keypoint representative of the wall-mounted clock may be updated to reflect the new location, as wall-mounted clocks are not typically frequently moved.

Figure 8:
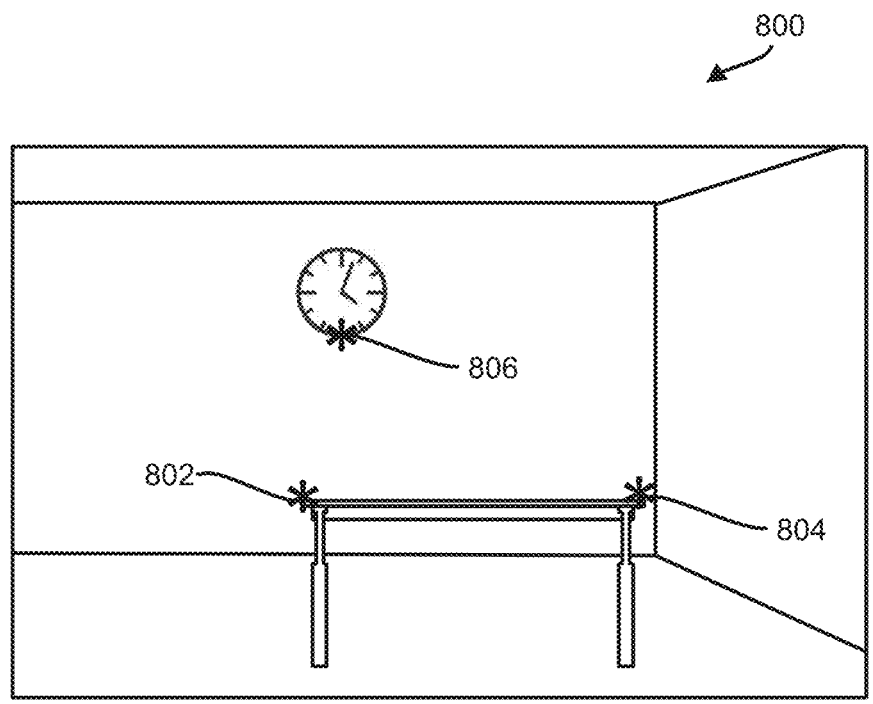
FIG. 8 shows a graphical illustration of archival keyframe for the location.

FIG. 8 shows a graphical illustration of archival keyframe 800 for the local environment of FIGS. 6 and 7. The archival keyframe 800 is illustrated as an image of the local environment showing a field of view from a particular point of view within the local environment. The point of view shown is within the local environment (e.g., the room) in front of the table and facing the wall including the wall-mounted clock. The image may include a subset of feature points visible in the image. The subject of feature points may include one or more of a fourteenth feature point 802 (e.g., corresponding to first feature point 602 in FIG. 6 and/or seventh feature point 702 in FIG. 7), a fifteenth feature point 804 (e.g., corresponding to second feature point 604 in FIG. 6 and/or eighth feature point 704 in FIG. 7), a sixteenth feature point 806 (e.g., corresponding to fifth feature point 610 in FIG. 6 and/or eleventh feature point 710 in FIG. 7), and/or other feature points.

Figure 9:
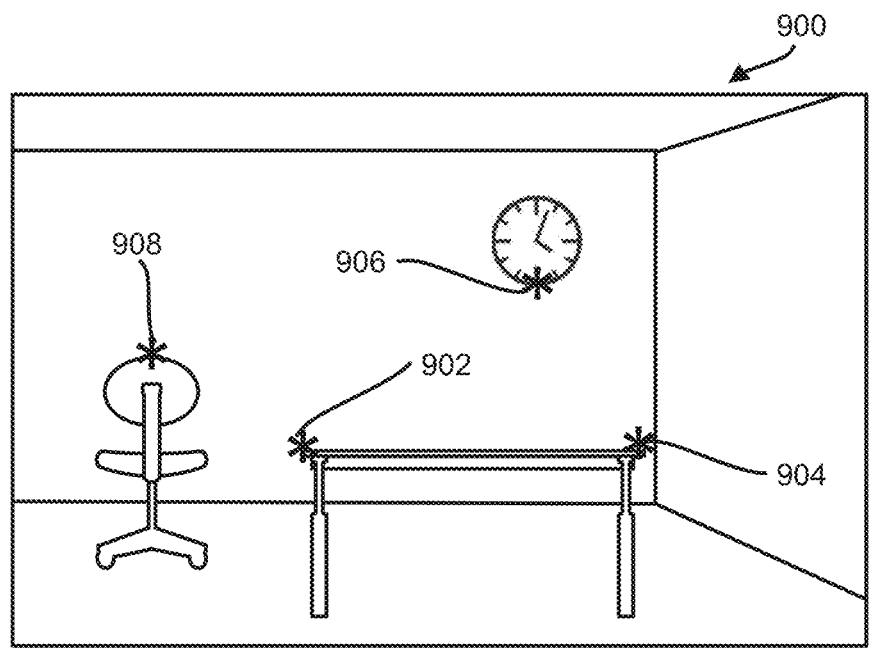
FIG. 9 shows a graphical illustration of current keyframe for the location.

FIG. 9 shows a graphical illustration of current keyframe 900 for the local environment of FIGS. 6 and 7. By way of non-limiting illustration, the graphical illustration may represent a keyframe in current location composition 700 (FIG. 7) as determined by current output signals from one or more sensors of a headset. The current keyframe 900 is illustrated as an image of the local environment showing the same particular field of view from the particular point of view within the local environment as FIG. 8. The image may include a subset of feature points visible in the image. The subject of feature points may include one or more of a seventeenth feature point 902 (e.g., corresponding to first feature point 602 in FIG. 6 and/or seventh feature point 702 in FIG. 7), a eighteenth feature point 904 (e.g., corresponding to second feature point 604 in FIG. 6 and/or eighth feature point 704 in FIG. 7), a nineteenth feature point 906 (e.g., corresponding to fifth feature point 610 in FIG. 6 and/or eleventh feature point 710 in FIG. 7), a twentieth feature point 908 (e.g., corresponding to thirteenth feature point 714 in FIG. 7), and/or other feature points. The archival keyframe 800 of FIG. 8 may be compared to current keyframe 900 of FIG. 9 to determine difference between the two and update the environmental record accordingly. In some implementations, comparisons using keyframes may be used in conjunction with comparisons using keypoints. For example, comparisons using keyframes may be used to confirm results from comparisons using keypoints.

In FIG. 1, one or more of processor(s) 104 of headset 102, one or more other headsets 121, environmental record server 126, external resource(s) 122, and/or other components may be operatively linked via one or more electronic communication links. For example, such electronic communication links may be established, at least in part, via network(s) 124.

Network(s) 124 may comprise one or both of wired and/or wireless communications (e.g., the Internet). It will be appreciated that this is not intended to be limiting and that the scope of this disclosure includes implementations in which one or more of processor(s) 104 of headset 102, one or more other headsets 121, environmental record server 126, external resource(s) 122, and/or other components may be operatively linked via some other communication media. In some implementations, network(s) 116 may be the same as network(s) 124 or may be separate and distinct networks.

The external resource(s) 122 may include sources of information, hosts, external entities participating with system 100, providers of virtual content, and/or other resources. In some implementations, some or all of the functionality attributed herein to external resource(s) 122 may be provided by resources included in system 100.

The processor(s) 104 may include and/or have access to electronic storage 112, and/or other components. The processor(s) 104 may include communication lines or ports to enable the exchange of information with a network and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 112 may comprise non-transitory electronic storage media that electronically stores information. The electronic storage media of electronic storage 112 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 112 may include one or more virtual storage resources (e.g., cloud storage, a virtual private network, and/or other virtual storage resources). Electronic storage 112 may store software algorithms, information determined by processor(s) 104, information received from other components of system 100, and/or other information that enables processor(s) 104 to function as described herein.

Processor(s) 104 is configured to provide information-processing capabilities for headset 102. As such, processor(s) 104 may include one or more of a physical processor, a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processors 104 may be configured to execute components 108, 110, 111, and/or other components. Processor(s) 104 may be configured to execute component 108, 110, 111, and/or other components by software; hardware; firmware; some combination of software, hardware, and/or firmware; and/or other mechanisms for configuring processing capabilities on processor(s) 104.

It should be appreciated that although components 108, 110, and 111 are illustrated in FIG. 1 as being co-located within a single processing unit, in implementations in which processor(s) 104 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 104 may be configured to execute one or more additional components that may perform some or all of the functionality attributed to individual ones of components 108, 110, 111, and/or other components.

The processor(s) 128 of environmental record server 126 may include and/or have access to electronic storage 140, and/or other components. The processor(s) 128 may include communication lines or ports to enable the exchange of information with a network and/or other components of system 100. Illustration of processor(s) 128 in FIG. 1 is not intended to be limiting. The processor(s) 128 may include a plurality of hardware, software, and/or firmware components operating together to provide the functionality attributed herein to processor(s) 128. For example, processor(s) 128 may be implemented by a cloud of computing platforms operating together as processor(s) 128.

Electronic storage 140 may comprise non-transitory electronic storage media that electronically stores information. The electronic storage media of electronic storage 140 may include one or both of system storage that is provided integrally (i.e., substantially non-removable) with processor(s) 128 and/or removable storage that is removably connectable to processor(s) 128 via, for example, a port or a drive. A port may include a USB port, a firewire port, and/or other port. A drive may include a disk drive and/or other drive. Electronic storage 140 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 140 may include one or more virtual storage resources (e.g., cloud storage, a virtual private network, and/or other virtual storage resources). Electronic storage 140 may store software algorithms, information determined by processor(s) 128, information received from other components of system 100, and/or other information that enables processor(s) 128 to function as described herein.

Processor(s) 128 is configured to provide information-processing capabilities in environmental record server 126. As such, processor(s) 128 may include one or more of a physical processor, a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include one or more processing units. These processing units may be physically located within the same device, or processor(s) 128 may represent processing functionality of a plurality of devices operating in coordination. The processor(s) 128 may be configured to execute components 132, 134, 136, 138, and/or other components. Processor(s) 128 may be configured to execute component 132, 134, 136, 138, and/or other components by software; hardware; firmware; some combination of software, hardware, and/or firmware; and/or other mechanisms for configuring processing capabilities on processor(s) 128.

It should be appreciated that although components 132, 134, 136, and/or 138 are illustrated in FIG. 1 as being co-located within a single processing unit, in implementations in which processor(s) 128 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 128 may be configured to execute one or more additional components that may perform some or all of the functionality attributed to individual ones of components 132, 134, 136, 138, and/or other components.

Figure 2:
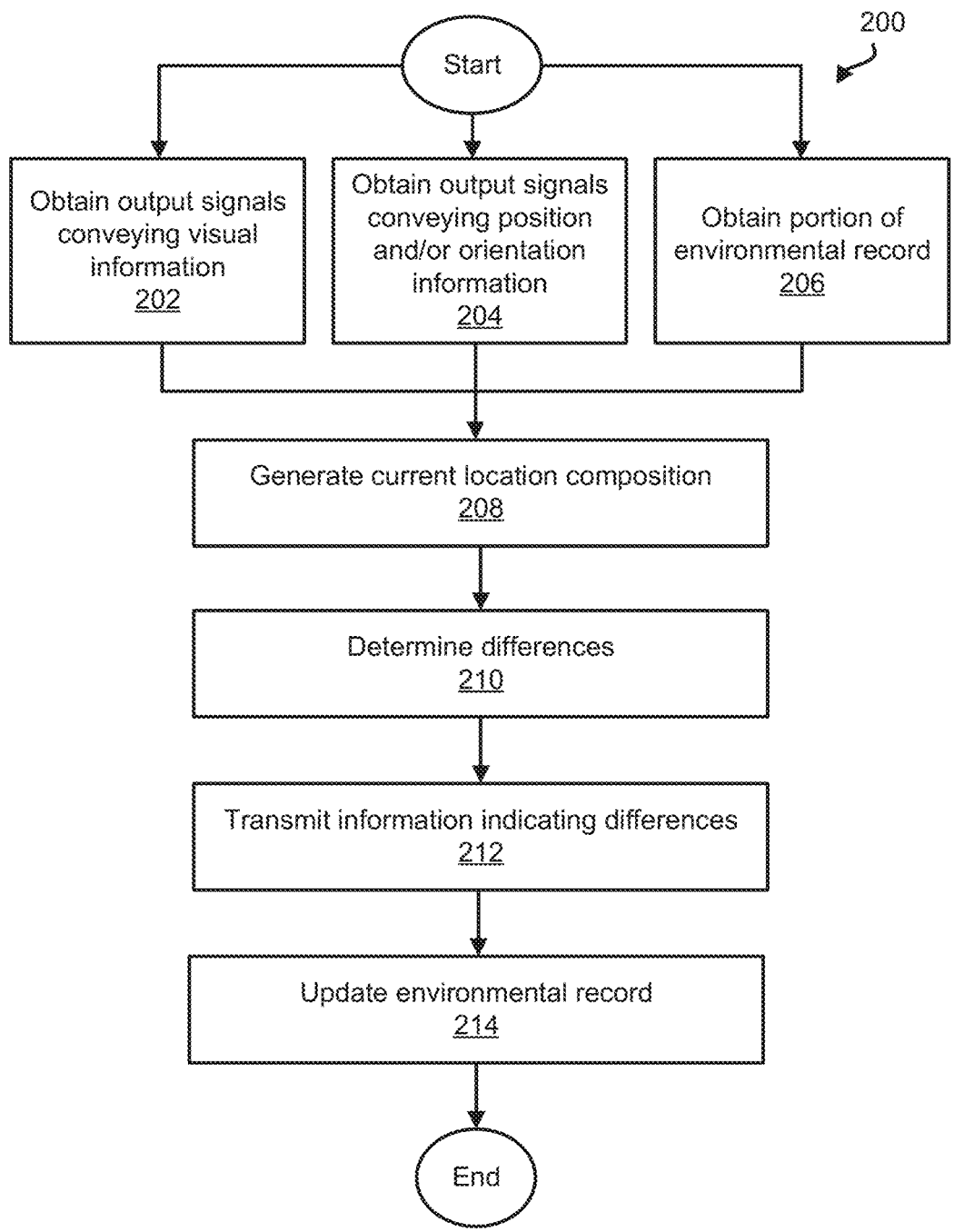
FIG. 2 illustrates a method to generate an environmental record within an interactive space, in accordance with one or more implementations.

FIG. 2 illustrates a method 200 to generate an environmental record for an interactive space, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in and/or using a system, such as system 100 shown in FIG. 1 and described herein. One or more physical processors may include one or more devices executing one or more of the operations of method 200 in response to instructions stored electronically on electronic storage media. The one or more processing devices may include one or more devices configured through hardware, firmware, and/or software to be specifically designed for execution of one or more of the operations of method 200.

At an operation 202, output signals conveying visual information may be obtained. The visual information may define images of a first local environment within a real-world environment over time. The real-world environment may include the first local environment and one or more other local environments. In some implementations, operation 202 may be performed by one or more physical processors executing an input component the same as or similar to input component 108 (shown in FIG. 1 and described herein).

At an operation 204, output signals conveying position and/or orientation information may be obtained. The position and/or orientation information may specify position and/or orientation of a headset over time. In some implementations, operation 204 may be performed by one or more physical processors executing an input component the same as or similar to input component 108 (shown in FIG. 1 and described herein).

At an operation 206, a portion of an environmental record of the real-world environment may be obtained from non-transitory electronic storage coupled to an environmental record server. The portion of the environmental record may represent an archival location composition for the first local environment. The archival location composition may define aspects of the first local environment including a description of a first set of one or more objects and/or surfaces previously determined to be present in the first local environment. In some implementations, operation 206 may be performed by one or more physical processors executing an input component the same as or similar to input component 108 (shown in FIG. 1 and described herein).

At an operation 208, a current location composition for the first local environment may be generated based on the obtained output signals and/or other information. The current location composition defining aspects of the first local environment may include a description of a second set of one or more objects and/or surfaces currently present in and/or moving through the first local environment. In some implementations, operation 208 may be performed by one or more physical processors executing a local environment component the same as or similar to local environment component 110 (shown in FIG. 1 and described herein).

At an operation 210, differences between the current location composition and the archival location composition may be determined. In some implementations, operation 210 may be performed by one or more physical processors executing an update component the same as or similar to update component 111 (shown in FIG. 1 and described herein).

At an operation 212, information indicating the differences may be transmitted to the environmental record server. In some implementations, operation 212 may be performed by one or more physical processors executing an update component the same as or similar to update component 111 (shown in FIG. 1 and described herein).

At an operation 214, the portion of the environmental record may be updated based on the information indicating the differences and/or other information. In some implementations, operation 214 may be performed by one or more physical processors executing an update component the same as or similar to update component 136 and/or an environmental record component the same as or similar to environmental record component 134 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to generate an environmental record for an interactive space, the system comprising:
   one or more client devices;
   one or more sensors coupled to each client device configured to:
   generate first output signals conveying visual information, the visual information defining images of a local environment within a real-world environment over time; and
   generate second output signals conveying position and/or orientation information, the position and/or orientation information specifying position and/or orientation of the client device over time;

a first set of one or more physical processors coupled to the client device configured by machine-readable instructions to:

obtain, from non-transitory electronic storage coupled to an environmental record server, a portion of an environmental record of the real-world environment that contains an archival location composition characterizing a first set of one or more objects and/or surfaces previously determined to be present in the local environment;

obtain the first and second output signals from the one or more sensors;

generate, based on the first and second output signals from the one or more sensors, a current location composition for the local environment characterizing a second set of one or more objects and/or surfaces currently present in the local environment;

the environmental record server that includes a second set of one or more physical processors configured by machine-readable instructions to:

obtain information indicating differences between the current location composition and the archival location composition, wherein the differences information includes information describing a new object or surface not presently included in the environmental record;

determine whether the information describing the new object or surface has been consistently obtained from the one or more client devices over a predetermined time period, wherein consistency is determined as a function of a threshold frequency with which the information describing the new object or surface has been obtained from the one or more client devices or as a function of a threshold number of the one or more client devices have obtained the information describing the new object or surface; and responsive to determining that information describing the new object or surface has been consistently obtained, update the portion of the environmental record that contains an archival location composition to include the information describing the new object or surface.

2. The system of claim 1, wherein the first set of one or more physical processors are configured by machine-readable instructions to:

determine the differences between the current location composition and the archival location composition by comparing the description of the first set of one or more objects and/or surfaces with the description of the second set of one or more objects and/or surfaces.

3. The system of claim 1, wherein the second set of one or more physical processors are configured by machine-readable instructions to:

determine the differences between the current location composition and the archival location composition by comparing the description of the first set of one or more objects and/or surfaces with the description of the second set of one or more objects and/or surfaces.

4. The system of claim 3, wherein determining the differences between the current location composition and the archival location composition comprises one or both of:

determining whether the first set of one or more objects and/or surfaces previously determined to be present in the local environment are currently present in the local environment; or determining whether the second set of one or more objects and/or surfaces currently present in the local environment includes objects and/or surfaces that were not previously determined to be present in the local environment.

5. The system of claim 4, wherein one of the first set of one or more physical processors or the second set of one or more physical processors are configured by machine-readable instructions to:

responsive to determining that one or more of the objects and/or surfaces in the first set of one or more objects and/or surfaces are present in both the archival location composition and current location composition, determine if there are any changes in position and/or orientation to those objects and/or surfaces; and responsive to determining that there are such changes in position and/or orientation of the objects and/or surfaces determined to be present in both the archival location composition and current location composition, update the portion of the environmental record with information indicating those changes, wherein the changes represent the differences.

6. The system of claim 4, wherein one of the first set of one or more physical processors or the second set of one or more physical processors are configured by machine-readable instructions to:

responsive to determining that one or more of the objects and/or surfaces in the first set of one or more objects and/or surfaces are not currently present in the local environment:

generate first information indicating which objects and/or surfaces are no longer present in the local environment;

generate second information including the information identifying the new object or surface; and update the portion of the environmental record based on the information indicating the differences determined between the objects and/or surfaces present in the current location composition and the archival location composition based on the first and second generated information.

7. The system of claim 4, wherein one of the first set of one or more physical processor or the second set of one or more physical processors are configured by machine-readable instructions to:

responsive to determining that the second set of one or more objects and/or surfaces currently present in the local environment includes the same objects and/or surfaces that were previously present in the local environment, determine there are no additions or updates to the archival location composition.

8. The system of claim 1, wherein the interactive space is an augmented reality space and the client device includes one or more image-forming components configured to generate images of virtual content superimposed over the user's view of the real-world environment.

9. The system of claim 8, wherein the client device is a headset.

10. A method to generate an environmental record for an interactive space viewable b\ one or more client devices, the method comprising:

obtaining first output signals conveying visual information to one of the one or more client devices, the visual information defining images of a local environment within a real-world environment over time;

obtaining second output signals conveying position and/or orientation information, the position and/or orientation information specifying position and/or orientation the client device over time;

obtaining a portion of an environmental record of the real-world environment that contains an archival location composition that defines a first set of one or more objects and/or surfaces previously determined to be present in the local environment;

generating, based on the first and second output signals, a current location composition for the local environment that define a second set of one or more objects and/or surfaces currently present in the local environment;

obtaining information indicating differences between the current location composition and the archival location composition, wherein the differences information describes a new object or surface not presently included in the environmental record;

determining that the information describing the new object or surface has been consistently obtained from the one or more client devices over a predetermined time period, wherein consistency is determined as a function of a threshold frequency with which the information describing the new object or surface has been obtained from the one or more client devices or a threshold number of the one or more client devices obtaining the information describing the new object or surface; and responsive to determining that information describing the new object or surface has been consistently obtained, update the portion of the environmental record that contains an archival location composition to include the information describing the new object or surface.

11. The method of claim 10, further comprising:
determining, at an environmental record server, the differences between the current location composition and the archival location composition by comparing the first set of one or more objects and/or surfaces with the second set of one or more objects and/or surfaces.

12. The method of claim 10, further comprising:
determining, at a client device, the differences between the current location composition and the archival location composition by comparing the first set of one or more objects and/or surfaces with the second set of one or more objects and/or surfaces.

13. The method of claim 12, wherein determining the differences between the current location composition and the archival location composition comprises one or both of:
determining whether the first set of one or more objects and/or surfaces previously determined to be present in the local environment are currently present in the local environment; or
determining whether the second set of one or more objects and/or surfaces currently present in the local environment includes objects and/or surfaces that were not previously determined to be present in the local environment.

14. The method of claim 13, further comprising:
responsive to determining that one or more of the objects and/or surfaces in the first set of one or more objects and/or surfaces are present in both the archival location composition and current location composition, determine if there are any changes in position and/or orientation to those objects and/or surfaces; and
responsive to determining that there are such changes in position and/or orientation of the objects and/or surfaces determined to be present in both the archival location composition and current location composition, update the portion of the environmental record with information indicating those changes, wherein the changes represent the differences.

15. The method of claim 13, further comprising:
responsive to determining that one or more of the objects and/or surfaces in the first set of one or more objects and/or surfaces are not currently present in the local environment:
generating first information indicating which objects and/or surfaces are no longer present in the local environment;
generating second information including the information identifying the canonical object; and
updating the portion of the environmental record based on the information indicating the differences determined between the objects and/or surfaces present in the current location composition and the archival location composition based on the generated first and second information.

16. The method of claim 13, further comprising:
responsive to determining that the second set of one or more objects and/or surfaces currently present in the local environment includes the same objects and/or surfaces that were previously present in the local environment, determining there are no additions or updates to the archival location composition.

17. The method of claim 10, wherein the interactive space is an augmented reality space facilitated by a client device including one or more image-forming components configured to generate images of virtual content superimposed over the user's view of the real-world environment.

18. The method of claim 17, wherein the client device is a headset.

* * * * *